UNITED STATES PATENT OFFICE.

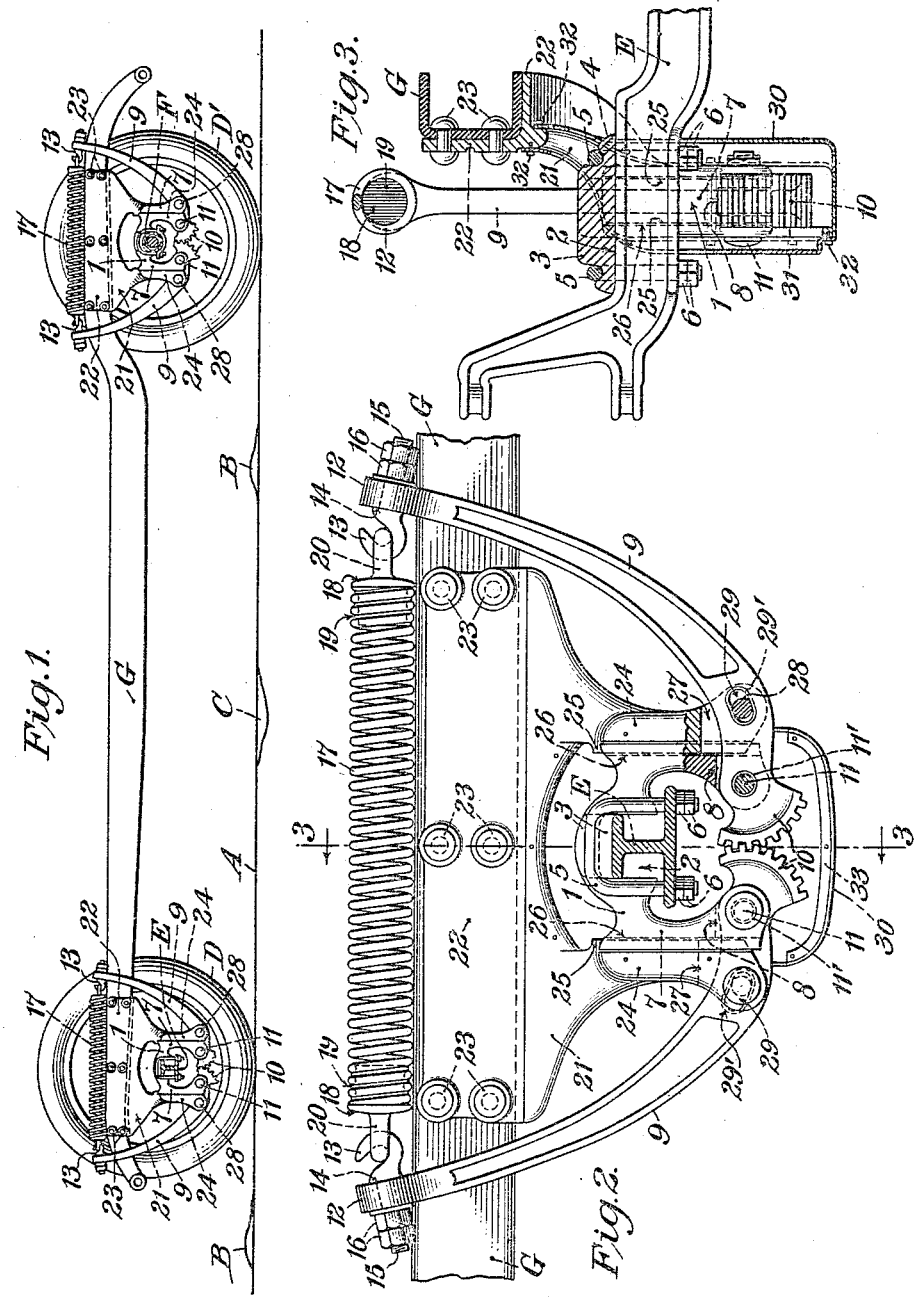

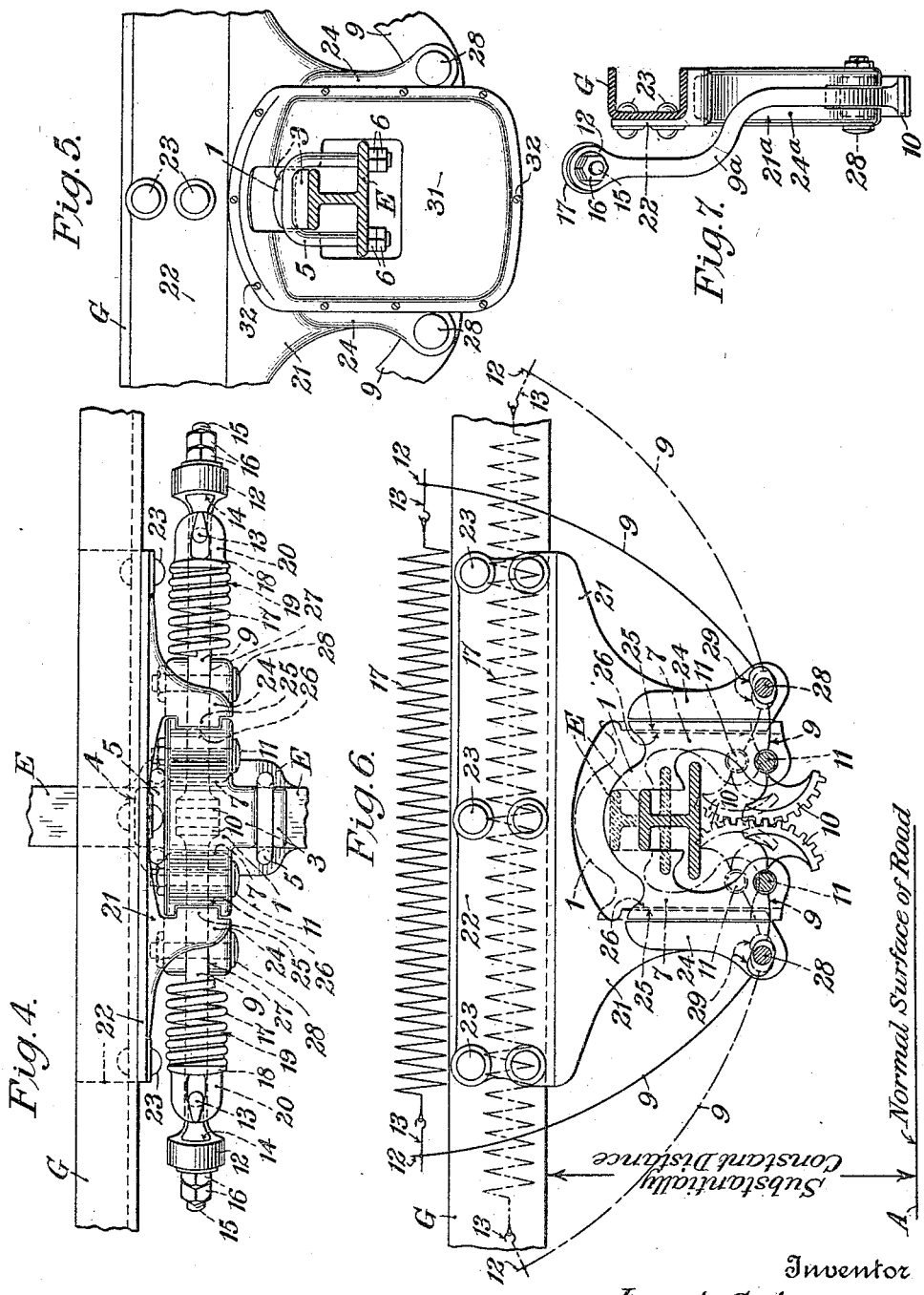

JOSEPH G. ARCARO, OF NEW YORK, N. Y.

SHOCK AND MOVEMENT ABSORBING SUPPORT FOR AUTOMOBILE-BODIES.

1,276,704.  Specification of Letters Patent.  Patented Aug. 27, 1918.

Application filed March 11, 1918. Serial No. 221,727.

*To all whom it may concern:*

Be it known that I, JOSEPH G. ARCARO, residing at New York city, New York, and being a citizen of the United States, have invented certain new and useful Improvements in Shock and Movement Absorbing Supports for Automobile-Bodies, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings:

Figure 1 is a side elevation of a chassis with my improved shock-and-movement absorbing devices applied thereto, the automobile wheels nearest the observer being absent and the axles being in section;

Fig. 2 is a front elevation, on an enlarged scale, of one of the shock-absorbing body-supporting devices, the front housing cover being removed;

Fig. 3 is a vertical transverse section thereof, taken on the line 3—3 of Fig. 2, the axle being shown in elevation;

Fig. 4 is a plan view of the device shown in Fig. 2, the central portion of the spring being broken out, and the housing being omitted;

Fig. 5 is a front elevation of the central portion of the shock-absorbing device, showing the front housing cover in place;

Fig. 6 is a diagrammatic view illustrating different coöperative relations of the parts of one of the shock-absorbing and body-stabilizing devices; and Fig. 7 is a transverse section through one of the side members of the chassis frame, showing on a smaller scale and in side elevation a modified arrangement of the parts of one of the devices.

The present invention relates to means for supporting the bodies of vehicles, particularly those of automobiles, in such manner that the bouncing of the body, as the vehicle traverses uneven road surfaces, is eliminated.

It is well known that the common practice of supporting a vehicle body or chassis at the free ends of semi-elliptical springs results in a magnified vertical play of the body of the car, often to a discomforting extent. Additional expense is incurred in the endeavor to minimize this detrimental feature, by the installation of numerous types of shock-absorbers.

An object of my present invention is to provide a shock-absorbing support for a chassis or vehicle body, of a type wherein the vehicle wheels accommodate themselves to the inequalities of the road, the body of the car being borne along continuously on the same horizontal plane without appreciable vertical deviation therefrom.

It is proposed to dispense with the usual elliptical or semi-elliptical supporting springs, auxiliary shock-absorbers and such supplementary means as are now used for diminishing the jouncing of the vehicle body. It is intended to substitute simple devices that will of themselves produce the even, undisturbed travel of the vehicle body that is so much sought.

Other novel features becoming manifest hereinafter are, of course, to be regarded as coming within the scope of the present invention as set forth in the appended claims.

Referring to the drawings, A, in Fig. 1, represents the normal surface of a road, resting upon which are the forward and back automobile wheels D and D', respectively. In this figure, these are the wheels that are on the side of the motor car that is remote from the observer. The wheels on the nearer side of the car are not shown, being absent by reason of the section through the axles being taken inwardly of said nearer wheels. It will be understood, however, that the forward wheels D are connected in usual manner by front axle E and the back wheels D' in any of the customary modes by a rear axle F.

A suitable chassis frame, having side members or sills G, is positioned above and extends beyond the front and rear axles E and F. The chassis side frame members G (one being shown and the other being similar) are connected to and supported from the front and rear axles E and F through the medium of my improved shock-absorbing, body-supporting devices, which are to be presently described. As shown in Fig. 1, these devices are located approximately at the positions usually given the semi-elliptical springs that support the motor car body or chassis from the axles in ordinary automobile practice.

One of the stressed body-supporting and shock-absorbing devices is shown on a larger scale in Figs. 2, 3, 4 and 5, while the automatic action of its parts is elucidated by diagrammatic Fig. 6. As shown in Fig. 2, a substantially inverted U-shaped slide 1 is provided with an axle-receiving socket 2, by means of which slide 1 is slipped over and rests or is seated upon axle E, which, while shown in Fig. 1 to be the front axle, may, in some types of motor vehicles, be the rear axle. Or, socket 2 may be conformed to the housing of a rear axle F, as shown in Fig. 1.

In addition to containing axle socket 2, the upper normally horizontal member of slide 1 is cruciform, having outer and inner bolt-seat extensions 3 and 4, respectively. U-bolts 5 have their upper closed ends seated in grooves in the upper sides of extensions 3 and 4, the spaced legs of the U-bolts passing down through a pad formed by the bottom flange of axle E. Suitable nuts 6 applied to the lower ends of the legs of the U-bolts serve to draw the horizontal cruciform portion of slide 1, and therefore the slide itself, into clamped and rigid relation to axle E. Also, the bolt-receiving extensions 3 and 4 provide an increased bearing surface of slide 1 on axle E, as shown in Figs. 3 and 4, whereby the permanent disposition of slide 1 to said axle is maintained with increased reliablity.

Depending from the upper cruciform portion of slide 1 are the spaced legs 7 of said slide. The lower ends of slide legs 7 are slotted or bifurcated, as at 8, and between the bifurcations of each leg 7 passes a curved lever 9 of peculiar formation. The lower end of each lever 9 is shaped into a gear sector 10, having an appropriate number of gear teeth. The center of rotation of the gear sector is coincident with the axis of a pivot pin 11 which passes through the lower portion of curved lever 9, and has its bearings in the bifurcations of the associated slide leg 7. Thus, to the lower end portion of each leg 7 of slide 1 is pivotally connected a curved lever 9, having a gear sector, the sectors of both levers 9 being in continual mesh.

Curving upwardly as they extend outwardly from pivot pins 11, levers 9 are shown to swell into substantially cylindrical upper terminals 12. Hooks 13, which extend longitudinally of chassis frame side members G, have enlarged portions that form shoulders 14 which bear against the inner faces of lever terminals 12. The stems 15 of hooks 13 pass through upper lever terminals 12 and have their outer end portions threaded. Nuts 16, co-acting with hook shoulders 14, firmly lock hooks 13 to the upper terminals 12 of levers 9. When desired, washers may be interposed between nuts 16 and said terminals 12, as shown.

A helical spring 17, of suitable size and capacity, extends between hooks 13 and is connected thereto by spring terminal-pieces 18. Said terminal pieces each have a cylindrical portion 19, grooved to correspond to the convolutions of spring 17, said portions 19 being threaded into the open ends of spring 17. Outside the ends of the spring, the terminal-pieces 18 therefor are provided with eyes 20, through which hooks 13 pass.

It now becomes evident that each individual shock-absorbing and body-supporting device includes a member rigidly secured to the axle, and which pivotally supports upwardly extending levers that spread apart to have comparatively widely spaced apart upper terminals. Also, that the upper terminals are connected by a spring of adequate strength, said spring tending to draw the upper terminals 12 of levers 9 together, thereby drawing said levers upwardly.

Comprised in each of the vehicle body-supporting devices is a bracket or pedestal 21 having an angular connection member 22 conformed to the chassis frame side member G, and strongly secured thereto, as by rivets 23. Below its upper angular portion 22, the bracket or pedestal 21, in the form illustrated in Figs. 1 to 6 inclusive, curves outwardly and then downwardly, and is provided with depending legs 24 alined with legs 7 of slide 1 that is secured to axle E. Means for holding legs 24 and 7 from mutual lateral displacement, and for insuring the proper relative sliding relation between these legs, is provided. They may be of any suitable type, but are shown as comprising guides 25 on legs 24 which fit into guide grooves 26 on legs 7, as best shown in Fig. 4.

Like legs 7, legs 24 have their lower end portions slotted or bifurcated, as at 27. Other pivot pins 28 pass through and are mounted in circular apertures in the bifurcations of legs 24. Each pivot pin 28 not only passes through a circular hole in each bifurcation of the leg 24 it is affiliated with, but also through an arcuate slot 29 in its associated lever 9. Slots 29 compensate for and permit the parallel movement of legs 7 and 24. Bushings 11' and 29' are inserted in the holes and slots through which pins 11 and 28 pass to resist any possible undue wear tending to deform said holes and slots.

Gear sectors 10 and slide 1 are protectively incased. As shown in Figs. 3 and 5, a housing having an inner or back section 30 and a front cover 31 attached thereto is employed, but said housing may be constructed in any suitable manner that proves advantageous. Both the back section 30 and front cover 31 are neatly conformed to the contour of pedestal 21, and are secured thereto and to each other in any appropriate manner, as by screws 32, there being suitable openings through the housing for the passage and movement of the parts. A strip 33 is secured to the bottom of section 30 to receive the screws passing through the bottom of cover 31.

By reference to Fig. 1, it will be appreciated that the front and rear axles E and F, respectively, which are supported from the ground through the wheels, in usual manner, have my improved shock-absorbing devices mounted upon them in the approximate positions of the usual semi-elliptical springs. It is also clear that legs 24 of the brackets or pedestals 21 are borne by the curved levers 9 through the agency of pivot pins 28. The brackets or pedestals 21 being rigidly secured to the chassis side frame members G, the chassis, and therefore the body of the motor car, is supported, through pedestals 21, their legs 24 and the pins 28, from the curved levers 9. Said levers, in turn, are supported indirectly from the axles and by the stiff springs 17 that connect the upper terminals of associate pairs of levers 9.

The operation of each device of the set of shock-absorbing, body-supporting devices, while the motor car is traveling, is similar, and it will, therefore, suffice to describe the action of one.

In Figs. 1 and 2, the chassis, of which the side member is designated as G, represents the usual load of the superstructure of the vehicle. That is, it may be regarded as indicative of the weight of the vehicle body, without the addition of passengers, baggage or the load of extraneous objects. Under these conditions, the pedestal 21, through its legs 24 and pins 28, imposes sufficient load on the associated pair of curved levers 9 to spread their upper terminals 12 sufficiently to stretch spring 17 a given extent, as shown in Figs. 2 and 6. Spring 17 may consequently be said to be shown in normal position in Fig. 2 and in that position in full lines in Fig. 6.

When the wheel D or D' encounters an obstacle, as a ridge or stone, indicated at B in Fig. 1, it will be driven upwardly thereby, raising the axle, as E, to the dot and dash line position indicated in Fig. 6. Slide 1 also moves up correspondingly, its legs 7 sliding upwardly along pedestal legs 24, also as shown in Fig. 6. Pins 11, which connect slide legs 7 with levers 9, are moved up by the raising of slide 1, thereby turning levers 9 to rotate their long arms downwardly about pins 28 that have bearings in the lower ends of pedestal legs 24. Slots 29 in levers 9 automatically readjust themselves to pins 28, without raising or lowering said pins appreciably, as shown in Fig. 6. Obviously, said pins 28 are still supported by the walls of slots 29, and, said pins 28 not having changed their vertical positions, the pedestal 21 and chassis side frame member G have also been held supported at substantially a constant distance from the normal or theoretical surface of the road. This occurs notwithstanding an actual uneven surface of the road.

As pins 11 are moved up with legs 7 of slide 1, lever slots 29 permitting relative parallel sliding of slide and pedestal legs 7 and 24, respectively, the long arms of levers 9 move downwardly, their upper terminals 12 spreading increasingly apart. The tension developed in spring 17 increases as well, and, as the wheel D or D' resumes travel on the normal surface of the road, pulls the upper ends of levers 9 back to their normal positions, spring 17 smoothly floating to its different positions as it is free of the vehicle body and pedestal. The other movable parts of the device are accordingly restored to their usual positions.

While the movable parts referred to are automatically adjusting themselves to the inequalities of the road, they are constantly under the control of the disturbing forces and the balancing and rectifying influence of spring 17. Moreover, because of the constant mesh between gear sectors 10, the stress resulting from the forces disturbing axle E and its associated parts, as well as the stress from spring 17, is equalized throughout the duplicate portions of the mechanism of the device. Furthermore, the load on levers 9 is concentrated at pins 28. Each lever 9 in acting, therefore, has a short arm extending toward pin 11 that is attached to slide 1 and a long arm from pin 28 extending toward an end of spring 17. Consequently, in turning, levers 9 oscillate about the axes of pins 28, which float in slots 29. The axes of pins 28 become the neutral points of turning for levers 9; said pins 28 therefore not moving up or down. The action of said parts is cushioned by said spring, which makes its expansion and contraction substantially horizontal, i. e., in a direction that exerts no influence to displace the chassis and vehicle body in a vertical direction. As shown in Fig. 6, slide 1, levers 9, the sectors 10 on their lower ends and the spring 17 respond readily to the jouncing influence of road obstacles and rise and fall, but this influence is not transferred to the pedestal legs 24, and there is no consequent bouncing of the chassis and the vehicle body.

If the wheel, as D', strikes a depression, as C in Fig. 1, the axle moves down accordingly, the parts allowing spring 17 to further contract, resulting in the upper ends of levers 9 moving closer together. Levers 9, in so acting, again turn about pins 28, permitting pins 11 to be lowered with slide 1. As before pins 28, under the influence of the abnormal stresses, and through the automatic adjustment of the movable parts, are neither raised nor lowered, and this is true of the chassis or vehicle body.

Fig. 7 illustrates a modified arrangement of some of the parts shown in Figs. 1 to 6 inclusive. The structure is substantially identical with that of those figures, except that the pedestal 21ª and its legs 24ª depend directly vertically, so that most of the parts are immediately under the chassis side frame member G. The spring 17 and the upper portions of levers 9ª remain as positioned in Figs. 1 to 6, but the levers 9ª are bent laterally to bring their lower portions into position to pass between the bifurcations at the lower ends of pedestal legs 24ª. This type I prefer to use in connection with front axles of motor cars, wherein it is now customary to place semi-elliptical springs under the chassis side frame members, to make a supporting connection between the front axle and the chassis frame.

There are relatively few parts in each of my devices, and these are of rugged construction. The action of the parts is delicately and automatically responsive to road irregularities of varying degrees, as well as being cushioned. The parts can easily be produced by standard methods of manufacture, and at a low cost.

What I claim is:—

1. The combination with an axle and vehicle body, of a shock and movement absorbing device comprising members respectively rigid with said axle and body and relatively slidable to each other, levers each pivotally connected to both of said members, and tension means independent of coöperative contact with the vehicle body and said member rigid therewith and tending to draw the free ends of said levers toward each other.

2. The combination with an axle and vehicle body, of a shock and movement obsorbing device comprising relatively slidable members respectively rigid with said axle and body, levers, tension means free from the vehicle body and said member rigid therewith and tending to draw the outer ends of said levers toward each other, and pivotal connections between each lever and both of said members, whereby said body is supported from said levers without vertical displacement.

3. The combination with an axle and vehicle body, of relatively slidable members respectively rigid with said axle and body, levers each pivotally connected with both of said members to oscillate about the centers of rotation of their pivotal connection with the member rigid with said body, and tension means tending to draw said levers toward each other to support the last mentioned member substantially vertically stationary, said means being movable bodily relative to said latter member.

4. The combination with an axle and vehicle body, of slidably engaged members respectively rigid with said axle and body, levers each pivotally connected to both of said members, and floating stress-developing means co-acting with said levers whereby the member rigid with said axle is permitted to rise and descend and the member rigid with said body is maintained substantially vertically stationary.

5. The combination with an axle and vehicle body, of slidably engaged members respectively rigid with said axle and body, levers each pivotally connected to both of said members, tension means tending to draw corresponding terminals of said levers toward each other and meshing gear means carried by the opposite end portions of said levers, thereby equalizing the stress in the various parts of the device.

6. The combination with an axle and vehicle body, of members respectively rigid with said axle and body and engaged for parallel relative sliding, levers, pivots connecting each lever with both of said members, there being slots in said levers co-acting with certain of said pivots to permit the relative sliding of said members, and tension means connecting free ends of said levers.

7. In a shock and movement absorbing device, a slide adapted for rigid combination with an axle and having spaced legs, levers pivoted to said legs, tension means connecting said levers, and a pedestal for attachment to a vehicle body and provided with legs articulatedly supported on said levers and engaged with the slide legs for mutual guidance.

8. In a shock and movement absorbing device, a slide comprising a cruciform crosspiece and slide legs connected thereby, portions of said cruciform piece forming an axle seat, levers connected to said legs, tension means connecting said levers and a pedestal having legs borne by said levers and engaged with said slide legs for relative guided sliding.

9. In a shock and movement absorbing device, a slide adapted for rigid combination with an axle, levers pivoted to said slide, tension means connecting said levers, and a vehicle-body-supporting pedestal comprising spaced legs engaging said slide and provided with pivot pin bearings in their lower portions, and pins held in said bearings mounting said pedestal on said levers.

10. In a shock and movement absorbing device, an axle-carried slide, a vehicle-body-supporting pedestal, pivot pins mounted respectively on said slide and pedestal, companion levers each provided with suitable apertures for the reception of some of the pins carried by said slide and pedestal and having means for regulating the movement of its companion lever, and stress-developing means applied to said levers.

11. In a shock and movement absorbing device, a pair of co-acting levers provided with meshig gear members at contiguous end portions thereof, said levers each having a hole and a slot, stress developing means co-acting with said levers at points nearer their opposite ends, an axle-carried slide and a pedestal, and pins carried thereby entering the holes and slots of said levers.

12. In a shock and movement absorbing device, a pedestal, a slide movably engaging the same, pivot pins carried by said pedestal and slide, levers having meshing gear sectors and being apertured for the passage of said pivot pins, and spring means connecting free end portions of said levers and being adapted to be placed under varying degrees of tension thereby.

13. In a shock and movement absorbing device, a pedestal with depending legs, a slide with legs movable along said pedestal legs, a pair of levers pivotally connected to the legs of said pedestal and slide, said levers have gear members in mesh, a removable housing for said gear members and slide secured to said pedestal, and tension means connecting said levers.

14. In a shock and movement absorbing device, a lever adapted to turn about an axis intermediate its ends, means to apply rotary force to said lever on opposite sides of said axis, a load-carrying member, and a floating pivot connecting said member and lever, the pivot axis constituting the center of rotation of said lever, whereby said pivot and load-carrying member remain unaffected by the turning of said lever.

In witness whereof I have hereunto set my hand in the presence of two witnesses.

JOSEPH G. ARCARO.

Witnesses:
CHARLES L. BELCHER,
SAM SCHLIER.

Copies of this patent may be obtained for five cents each, by addressing the "Commissioner of Patents, Washington, D. C."